United States Patent [19]
Wittig et al.

[11] Patent Number: 5,312,158
[45] Date of Patent: May 17, 1994

[54] HINGE JOINT FOR USE IN THE SEATS OF MOTOR VEHICLES AND THE LIKE

[75] Inventors: Werner Wittig, Winnweiler; Karin Becker, Rockenhausen, both of Fed. Rep. of Germany

[73] Assignee: Keiper Recaro GmbH. & Co., Remscheid, Fed. Rep. of Germany

[21] Appl. No.: 897,997

[22] Filed: Jun. 16, 1992

[30] Foreign Application Priority Data

Jun. 18, 1991 [DE] Fed. Rep. of Germany ....... 4119980

[51] Int. Cl.[5] ............................................. B60N 2/22
[52] U.S. Cl. ...................................................... 297/362
[58] Field of Search ................... 297/361, 362, 361.1, 297/362.12; 475/175, 162; 74/411.5

[56] References Cited

U.S. PATENT DOCUMENTS

| | | | |
|---|---|---|---|
| 4,371,207 | 2/1983 | Wilking | 297/348 |
| 4,563,039 | 1/1986 | Jörg | 297/362 |
| 4,786,110 | 11/1988 | Mahling | 297/362 |
| 5,154,475 | 10/1992 | Kafitz | 297/362 |

*Primary Examiner*—Kenneth J. Dorner
*Assistant Examiner*—Milton Nelson, Jr.
*Attorney, Agent, or Firm*—Darby & Darby

[57] ABSTRACT

A hinge joint for use between the body supporting portion and the pivotable back rest of a seat has a first leaf which is affixed to the body supporting portion, a second leaf which is affixed to the back rest, and a pintle which pivotably connects the second leaf to the first leaf. In order to reduce friction during pivoting of the second leaf, the latter is provided with a sleeve-like central portion which is surrounded by an antifriction bearing installed in the cylindrical portion of a cupped motion transmitting member of the pintle. A smaller-diameter portion of the motion transmitting member is surrounded by two wedge-like arcuate sections which are biased by a torsion spring against a cylindrical internal surface of the first leaf to reduce radial play between the leaves. Friction between the external surfaces of the sections and the internal surface can be reduced by coating some or all of these surfaces with a lubricant. Such lubricant can also be used between the internal surface of the first leaf and an annular centering element which is installed within the first leaf axially adjacent the sections. In addition, friction between the centering element and the first leaf can be reduced by providing the internal surface of the first leaf and/or the external surface of the centering element with facets and/or recesses.

19 Claims, 2 Drawing Sheets

HINGE JOINT FOR USE IN THE SEATS OF MOTOR VEHICLES AND THE LIKE

BACKGROUND OF THE INVENTION

The invention relates to hinge joints in general, and more particularly to improvements in hinge joints which can be utilized with advantage between the adjustable back rests and the body supporting portions of seats, such as the driver's seat or the passenger seat next to the driver's seat in a motor vehicle.

A hinge joint which is used between the back rest and the body supporting portion of the seat in a motor vehicle normally comprises a first component or leaf which is affixed to the body supporting portion, a second component or leaf which is affixed to the back rest, a pintle which pivotally connects the second component with the first component, and a mechanism which can pivot the second component and the back rest relative to the first component and can maintain the back rest in a selected angular position. Reference may be had to commonly owned U.S. Pat. No. 4,371,207 granted Feb. 1, 1983 to Wilking et al. for "Position adjuster for motor vehicle seats and windows". The hinge joint of this patent employs a motion transmitting member which is rigid with the pintle and is partially surrounded by two substantially wedge-like arcuate sections which, in turn, are surrounded by a cylindrical internal surface of the first component. The sections are biased by a spring which urges their external surfaces against the internal surface of the first component. These sections can be said to constitute an eccentric which serves to maintain a spur gear of the first component in partial mesh with an internal gear of the second component. The central portion of the pivotable second component is rotatably mounted on a cylindrical portion of the pintle. The hinge joint of Wilking et al. is designed to establish one or more clearances which are intended to reduce friction during adjustment of the second component and back rest relative to the first component and body supporting portion of the seat. The clearance or clearances should develop when the adjustment begins, and such clearance or clearances should disappear when the adjustment of the back rest relative to the body supporting portion of the seat is completed. Nevertheless, each adjustment of the inclination of the back rest necessitates the exertion of a rather pronounced force because the engagement between the second component and the pintle suffices to generate a substantial amount of friction which must be overcome by the person seeking to change the inclination of the back rest.

OBJECTS OF THE INVENTION

An object of the invention is to provide a hinge joint wherein the second component can be pivoted about the axis of the pintle with the exertion of a relatively small force.

Another object of the invention is to provide a hinge joint which is constructed and assembled in such a way that the clearances which develop in the course of an adjusting operation disappear when the adjustment is completed.

A further object of the invention is to provide novel and improved components or leaves for use in the above outlined hinge joint.

An additional object of the invention is to provide a novel and improved pintle for use in the above outlined hinge joint.

Still another object of the invention is to provide a simple, compact and inexpensive hinge joint which can be utilized as a superior substitute for heretofore known hinge joints between the back rests and the body supporting portions of seats for use in motor vehicles and/or for other purposes.

An additional object of the invention is to provide novel and improved means for reducing friction between certain constituents of the above outlined hinge joint.

A further object of the invention is to provide novel and improved biasing means for use in the above outlined hinge joint.

Another object of the invention is to provide a hinge joint which constitutes an improvement over and a further development of the hinge joint which is disclosed in U.S. Pat. No. 4,371,207.

An additional object of the invention is to provide a hinge joint which constitutes an improvement over and a further development of the hinge joint disclosed in commonly owned copending patent application Ser. No. 07/626,484 filed Dec. 12, 1990 by Egon Kafitz for "Hinge joint for the seats of motor vehicles and the like".

Still another object of the invention is to provide a novel and improved method of reducing friction between neighboring substantially cylindrical surfaces of certain constituents of the above outlined hinge joint.

SUMMARY OF THE INVENTION

The invention is embodied in a hinge joint which can be utilized to permit changes in the position of a back rest relative to a body supporting portion of a seat, particularly in a vehicle (such as a motor vehicle). The improved hinge joint comprises a first component or leaf which is connectable with the body supporting portion, a second component or leaf which is connectable with the back rest, a pintle which pivotally connects the components and comprises a motion transmitting member, two substantially wedge-like sections which extend circumferentially of and surround portions of the motion transmitting member, means for biasing the sections away from each other against an internal surface of one of the components, an antifriction bearing which is provided between the motion transmitting member and surrounds a portion of one of the components, and means for pivoting the second component relative to the first component between a plurality of different positions. The pivoting means includes means for releasably holding the second component in a selected position. The arrangement is or can be such that the internal surface is provided in the first component and the bearing surrounds a portion of the second component.

The pivoting means can comprise a gear transmission.

The two substantially wedge-like sections can be mirror images of each other with reference to a plane including the axis of the pintle.

The bearing can surround a substantially centrally located portion of the second component, and such portion of the second component can include or constitute a sleeve which surrounds the pintle with some clearance. The arrangement is preferably such that the bearing surrounds the sleeve and is surrounded by the motion transmitting member. The second component can further comprise a substantially plate-like portion of metallic sheet material, an the sleeve can be non-rotatably anchored (e.g., a press fit) in the plate-like portion of the second component.

The second component can be provided with a chamber for the biasing means, and the sleeve of the second component preferably bounds a portion of the chamber. The latter is preferably an annular chamber which surrounds the sleeve, i.e., the sleeve bounds the radially inner portion of the chamber.

The biasing means can comprise a torsion spring, particularly a spring having an arcuate median portion extending circumferentially of the pintle and two end portions which extend substantially axially of the pintle and each of which engages one of the wedge-like sections.

The hinge joint preferably further comprises means for reducing friction between the internal surface of the first component and the wedge-like sections. Such friction reducing means can be provided on the internal surface and/or on those (external) surfaces of the sections which are adjacent the internal surface. The friction reducing means can comprise a lubricant, such as a suitable lacquer, which coats the internal surface and/or at least one of the two external surfaces.

The hinge joint further comprises a substantially annular centering element which is surrounded by the internal surface of the first component and is adjacent the wedge-like sections (as seen in the axial direction of the pintle). The centering element has an external surface which is adjacent the internal surface of the first component, and at least one of these surfaces can be provided with friction reducing means, such as a layer of lacquer or another suitable lubricant. In addition to or in lieu of lubricant, the friction reducing means can comprise recesses in one of the surfaces to thus reduce the overall area of contact between the internal and external surfaces. The same or similar results can be achieved by shaping one of the surfaces in such a way that it includes facets which are out of contact with the other surface, i.e., the other surface contacts only those portions of the facetted surface which alternate with the facets (as seen in the circumferential direction of the respective surface).

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
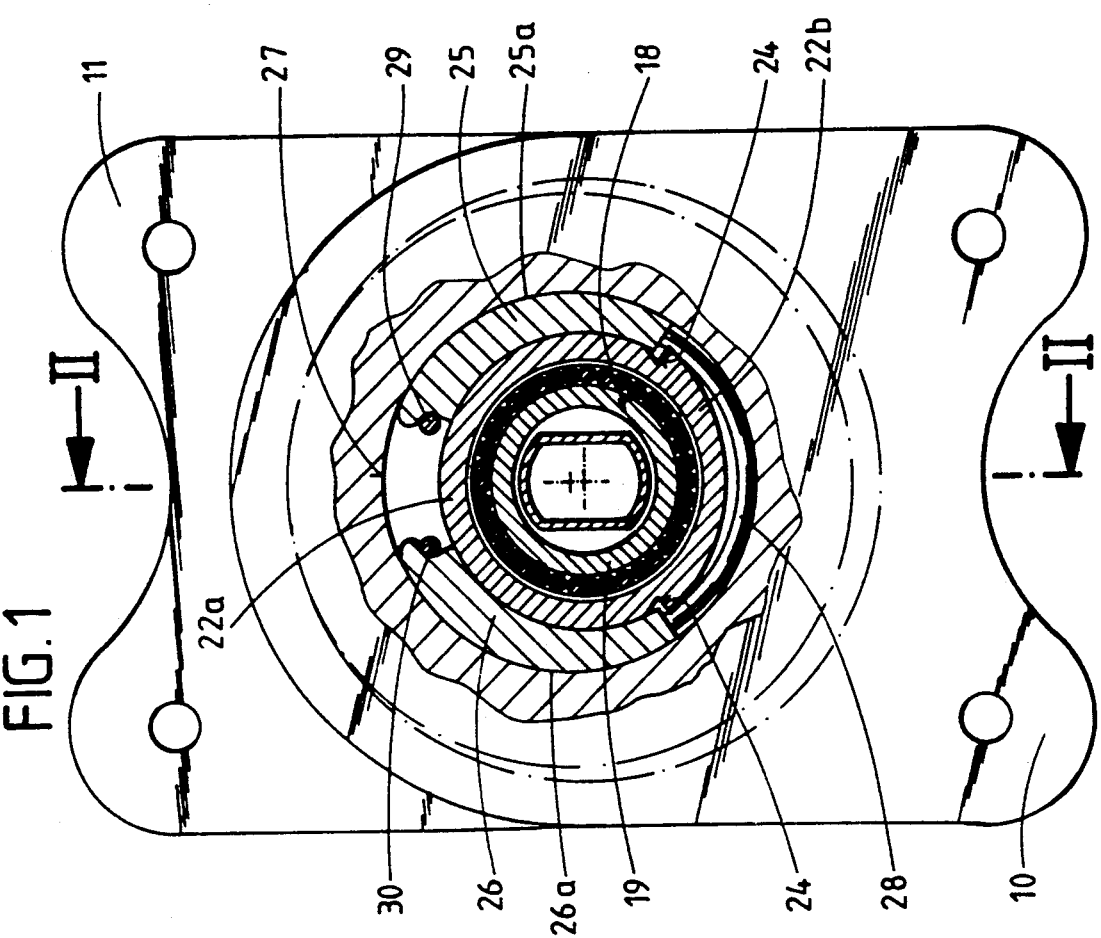
FIG. 1 is a partly elevational and partly sectional view of a hinge joint which embodies one form of the invention, the section being taken in the direction of arrows as seen from the line I—I in FIG. 2.
Figure 2:
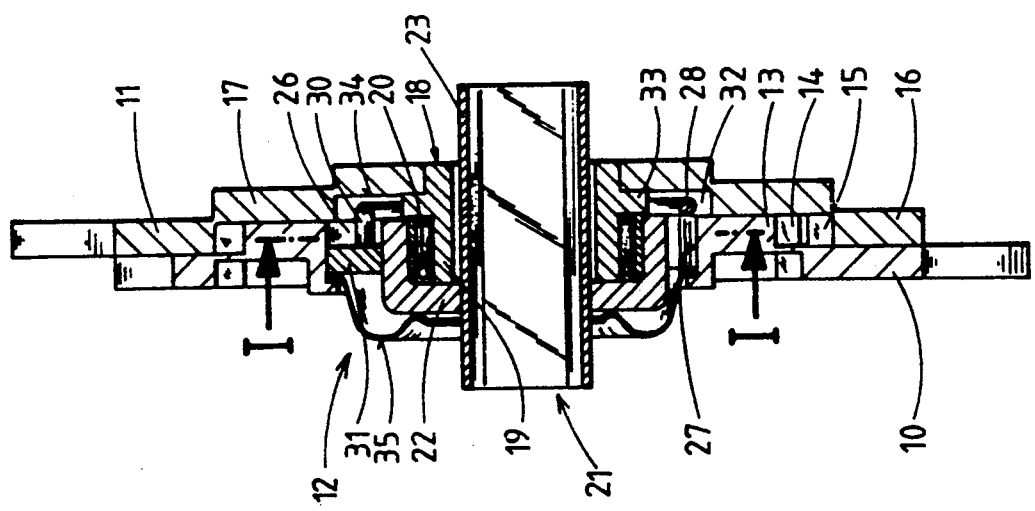
FIG. 2 a sectional view substantially as seen in the direction of arrows from the line II—II in FIG. 1.

The hinge joint which is shown in FIGS. 1 and 2 comprises a first component or leaf 10 which can be affixed to the body supporting portion of a seat in a motor vehicle (e.g., a driver's seat), a second component or leaf 11 which can be affixed to the pivotable back rest of such seat, and a pintle 21 which connects the components 10, 11 to each other in such a way that the back rest can be pivoted relative to the body supporting portion between a plurality of different angular positions. The pintle 21 defines a substantially horizontal pivot axis. The illustrated hinge joint is one of two hinge joints which are used to pivotally connect the back rest to the body supporting portion of a seat. Reference may be had, for example, to FIG. 1 of commonly owned U.S. Pat. No. 4,786,110 granted Nov. 22, 1988 to Mahling et al. for "Hinge joint for seats of motor vehicles and the like".

The hinge joint further comprises means for pivoting the component 11 relative to the component 10 and for releasably holding the component 11 in a selected angular position. The pivoting means comprises a transmission 12 the exact details of which form no part of the present invention because a similar transmission is disclosed in numerous United States and foreign patents of the assignee. Reference may be had, for example, to commonly owned U.S. Pat. No. 4,563,039 granted Jan. 7, 1986 to Jörg for "Hinge joint for use in the seats of motor vehicles and the like". The illustrated transmission 12 comprises a spur gear 13 which constitutes an integral stamped part of the substantially plate-like component 10 and has radially outwardly extending teeth 14 in partial mesh with the radially inwardly extending teeth 16 of an internal gear 15 which is an integral stamped part of the substantially plate-like component 11. The addendum circle of the spur gear 13 is smaller than the dedendum circle of the internal gear 15, and the difference between the diameters of such circles at least equals the radial dimension of a tooth 14 or 16. The number of internal teeth 16 exceeds, at least by one, the number of external teeth 14. The internal gear 15 of the component 11 can roll along the spur gear 13 of the component 10.

The plate-like main section of the component 11 includes a washer-like portion 17 which is axially offset relative to the internal gear 15 as a result of deformation of the originally flat blank of which the component 11 is made in a precision stamping machine. The central portion of the component 11 is constituted by a sleeve 18 which is non-rotatably affixed to the portion 17 and surrounds the adjacent tubular portion 23 of the pintle 21 with a certain amount of clearance. For example, the sleeve 18 can be a press fit in the central opening of the portion 17 or can be welded to the portion 17, and this sleeve comprises an external collar 33 which abuts the adjacent side 34 of the portion 17. If the sleeve 18 is bonded to the portion 17, such bonding is preferably carried out in a so-called stored energy welding machine (also known as capacitor discharge welding machine). A cylindrical portion 19 of the sleeve 18 extends axially through and is spacedly surrounded by the spur gear 13 of the stationary component 10 and by the internal gear 15 of the pivotable component 11. The cylindrical portion 19 of the sleeve 18 is surrounded by an antifriction ball bearing 20 with minimal clearance or with no play at all, and the bearing 20 is surrounded by a cupped motion transmitting member 22 of the pintle 21. The member 22 is non-rotatably but axially movably mounted on the tubular portion 23 of the pintle 21. The arrangement may be such that the member 22 is provided with a non-circular internal surface which surrounds a complementary non-circular external surface of the tubular portion 23.

As can be seen in FIG. 1, the member 22 (which shares the angular movements of the pintle 21) includes a smaller-diameter portion 22a and a larger-diameter portion 22b defining with the portion 22a two radially extending shoulders 24 making an angle of more than 180° (as measured clockwise from the left-hand shoulder 24 toward the right-hand shoulder 24 of FIG. 1). The smaller-diameter portion 22a of the member 22 is surrounded by two substantially wedge-like arcuate sections 25, 26 which are biased toward the adjacent shoulders 24 and against a cylindrical internal surface 27 of the component 10 by a torsion spring including an arcuate median portion 28 extending circumferentially of the pintle 21 and two end portions 29, 30 which extend in substantial parallelism with the axis of the pintle and engage the adjacent end faces of the respective wedge-like sections 25, 26. The end portion 29 biases the convex external surface 25a of the section 25 against the adjacent portion of the internal surface 27, and the end portion 30 biases the convex external surface 26a of the section 26 against the adjacent portion of the internal surface 27. The illustrated sections 25, 26 are mirror images of each other with reference to a plane which includes the axis of the pintle 21. The center of the internal surface 27 is located on the axis of the spur gear 13. The sections 25, 26 are received in and nearly fill a substantially sickle-shaped space between the portion 22a of the motion transmitting member 22 and the internal surface 27 of the component 10. These sections are actually separable parts of the pintle 21.

The median portion 28 of the torsion spring for the sections 25, 26 constitutes a portion of one full convolution and is received in an annular chamber 32 which is constituted by a depression in the portion 17 of the component 11. The chamber 32 is bounded in part by the collar 33 of the sleeve 18, namely the chamber 32 surrounds the collar 33. The chamber 32 is obtained by shifting the central part of the portion 17 (e.g., in the aforementioned stamping machine) axially and further away from the plane of the internal gear 15 to thus form a depression adjacent the side 34. The torsion spring 28-30 serves to bias at least one tooth 16 of the internal gear 15 into mesh with the adjacent teeth 14 of the spur gear 13. Such biasing action takes place as a result of the bias of the end portions 29, 30 which urge the external surfaces 25a, 26a of the respective wedge-like sections 25, 26 against the adjacent portions of the internal surface 27 of the component 10. The sections 25, 26 cooperate with the torsion spring 28-30 to ensure that the gears 13, 15 are eccentric relative to each other and to thus maintain the gear 15 in partial mesh with the gear 13 in each angular position of the component 11 relative to the component 10.

The hinge joint further comprises a substantially annular centering element 31 which is surrounded by the internal surface 27 and is adjacent the wedge-like sections 25, 26 (as seen in the axial direction of the pintle 21). Thus, the centering element 31 is also installed in the aforementioned sickle-shaped space for the sections 25 and 26, such space being surrounded by the internal surface 27 and surrounding the motion transmitting member 22 of the pintle 21. The manner in which the centering element 31 cooperates with the wedge-like sections 25, 26 is or can be the same as disclosed in the aforementioned commonly owned copending patent application Ser. No. 07/626,484 of Kafitz. The disclosure of this copending application is incorporated herein by reference and can be resorted to for full understanding of the mode of operation of the hinge joint of FIGS. 1 and 2. The latter further comprises a ring-shaped cover or lid 35 which is slipped onto the tubular portion 23 of the pintle 21 adjacent the motion transmitting member 22 and serves to seal the aforementioned sickle-shaped space between the internal surface 27 of the component 10 and the member 22. The purpose of the cover 35 is to prevent lacquer or other substances which are applied to the exterior of the hinge joint from penetrating into the sickle-shaped space wherein such substance or substances could bond the sections 25, 26 to the centering element 31 and/or to the motion transmitting member 22 and/or to the torsion spring 28-30 and/or to the component 10. The cover 35 can be omitted if the central portion of the component 10 is shifted to the left (as viewed in FIG. 2) so that it can replace the cover and seal the sickle-shaped space from the surrounding atmosphere.

Figure 3:
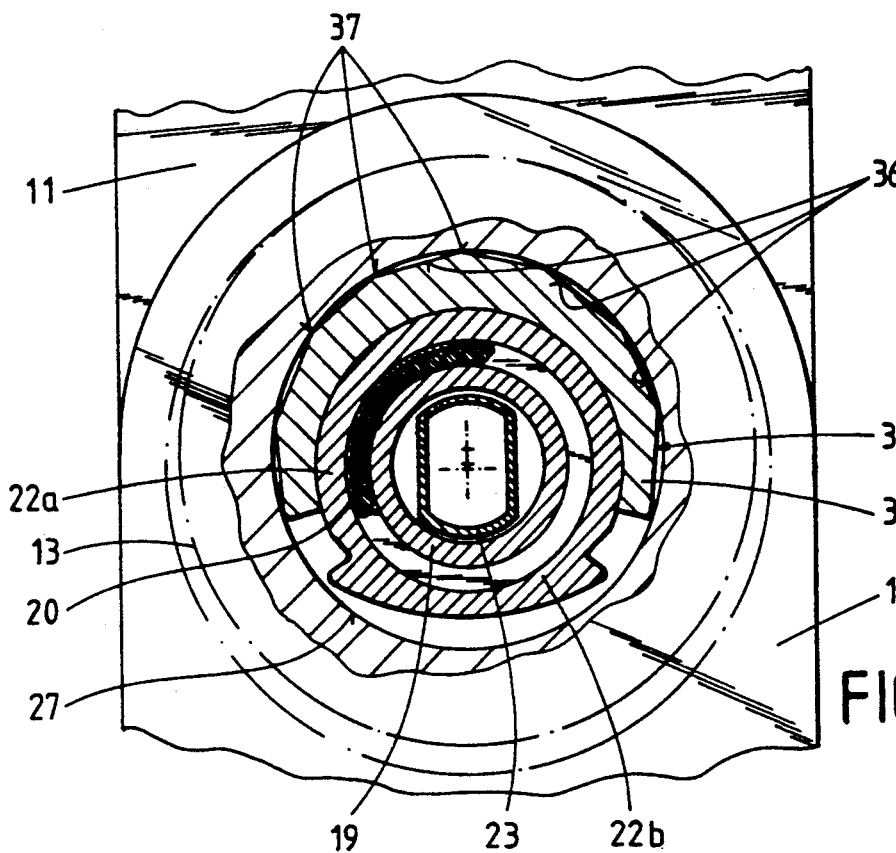
FIG. 3 is a fragmentary partly elevational and partly sectional view of a modified hinge joint.
Figure 4:
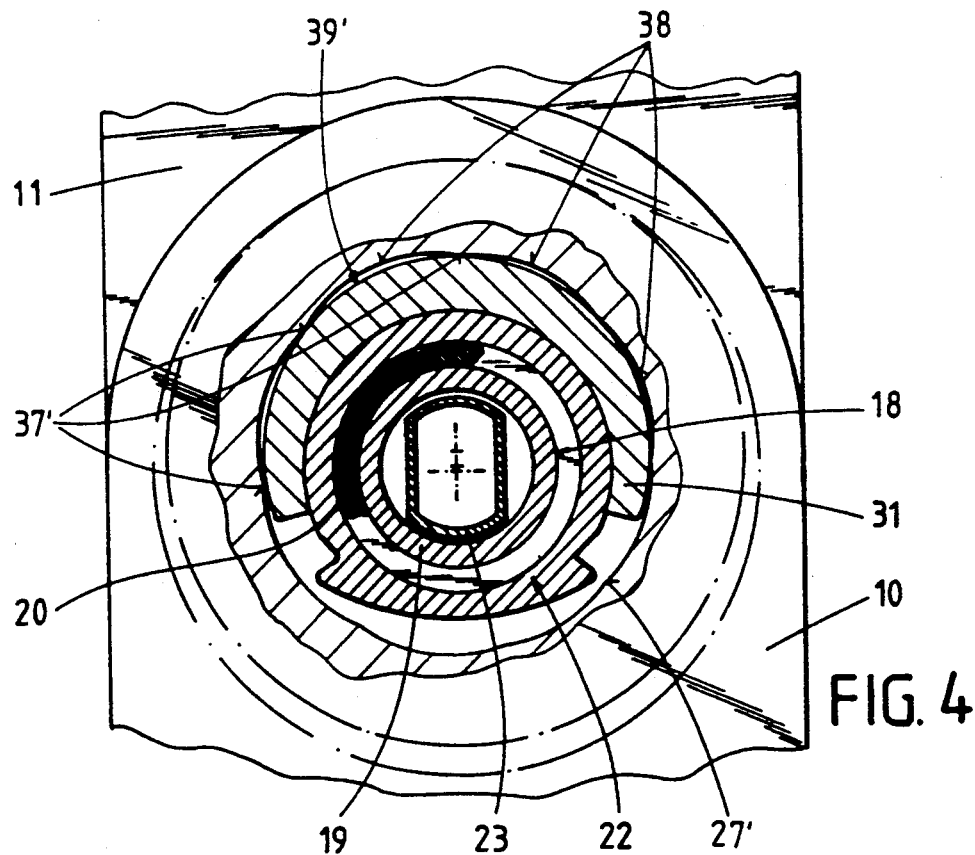
FIG. 4 is a fragmentary partly elevational and partly sectional view of a third hinge joint constituting a modification of the hinge joint of FIG. 3.

The antifriction bearing 20 can comprise one or more annuli of balls, needles or otherwise configurated friction reducing rolling elements between an inner race which surrounds the cylindrical portion 19 of the sleeve 18 and the axially extending portion of the cupped motion transmitting member 22. This bearing serves to reduce friction during changes of angular position of the component 11 about the axis of the pintle 21. On the other hand, friction between the motion transmitting member 22 and the fixedly mounted component 10 must suffice to establish a self-locking action. However, and in order to impose limits upon the actuating or operating moment which is influenced by friction between the member 22 and the component 10, as well as upon the judder, such friction is preferably controlled, for example, in a manner as shown in FIGS. 3 and 4, in order not to exceed a certain limit.

The problem of judder is especially acute when the component 11 is to be adjusted against the weight of the back rest. Such adjustment entails a growing resistance which is attributable primarily to friction and results in jerky stepwise movements of the component 11 relative to the component 10. Thus, the pivotal movement of the component 11 is composed of relatively slow angular displacements which alternate with more rapid angular displacements, and the totality of such movements is comparable to a rather pronounced vibratory movement.

An important advantage of the improved hinge joint is that the adjustments of the inclination of the second component 11 and back rest relative to the first component 10 and body supporting portion of a seat can be carried out with the exertion of a surprisingly small force. The reason is that the component 11 need not overcome any sliding friction at the locus (of the bearing 20) where it pivots relative to the pintle 21. At the same time, the wedge-like sections 25, 26 eliminate play between the components 10 and 11.

The illustrated torsion spring 28-30 exhibits the advantage that it occupies a minimal amount of space in a portion of the hinge joint where the space is at a premium. particularly if one takes into consideration the desirable optimal characteristic of the spring. Thus, the spring 28-30 is accommodated in the chamber 32 which can be provided directly in the plate-like portion 17 of the pivotable component 11. However, it is equally within the purview of the invention to employ other means for biasing the wedge-like sections 25, 26 against the internal surface 27 or 27' and toward the respective stops 24 of the cupped motion transmitting member 22.

Referring first to FIG. 3, the internal surface 27 of the component 10 (such surface is surrounded by the spur gear 13) is coated, at least in part, with a suitable lubricant, e.g., a lacquer which reduces friction with the external surface 39 of the centering element 31'. In order to further reduce friction between the surfaces 27 and 39, the surface 39 is provided with flat or even concave facets 36 which alternate with relatively small areas 37 of contact between the surfaces 39 and 27. The pressure between the areas 37 and the internal surface 27 is relatively high; however, the overall area of contact between the surfaces 27 and 39 is relatively small. The number and dimensions of the facets 36, together with the friction reducing properties of lubricant which coats the internal surface 27, can be readily selected in such a way that the friction between the component 10 and the motion transmitting member 22 is maintained within the desired optimum range.

It is further within the purview of the invention to omit the facets 36 and to coat the surface 27 as well as the surface 39 with lacquer or another suitable lubricant, or to use the facets 36 in addition to the layers of lubricant on each of the surfaces 27 and 39. It is presently preferred, for the sake of economy, to apply lubricant to only one of the surfaces 27, 39.

FIG. 4 shows a modified friction reducing arrangement. The internal surface 27' of the component 10 is provided with an annulus of recesses 38 so that only the areas 37' (which alternate with the recesses 38 in the circumferential direction of the spur gear 13) of the surface 27' can come into actual contact with the cylindrical external surface 39' of the centering element 31. The surface 39' can be coated with a layer of lacquer or another suitable lubricant. The pressure between the surfaces 27' and 39' (i.e., between the areas 37' of the surface 27' and the surface 39') is increased; however, the extent of friction between the component 10 and the element 31 is reduced and can be maintained within an optimum range by proper selection of the lubricant and/or by appropriate selection of the dimensions and/or number of recesses 38.

The pockets which develop next to the facets 36 of FIG. 3 or as a result of the provision of recesses 38 which are shown in FIG. 4 can be used to confine supplies of flowable lubricant and/or to confine fragments of material which are removed from relatively movable parts during adjustment of the angular position of the pivotable component 11.

The centering element 31 or 31' constitutes an advantageous and desirable but optional feature of the improved hinge joint. If the centering element is omitted, the hinge joint can operate in a manner as disclosed in the aforementioned commonly owned U.S. Pat. No. 4,371,207 to Wilking et al.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A hinge joint for changing the position of a back rest relative to the body supporting portion of a seat, comprising: a first component; a second component; a pintle having an axis and pivotally connecting said second component with said first component, said pintle comprising a motion transmitting member; two substantially wedge shaped sections extending circumferentially of and surrounding portions of said motion transmitting member; means for biasing said sections away from each other against an internal surface of one of said first and second components; a bearing provided within and engaging said motion transmitting member and surrounding and engaging a portion of one of said first and second components; and a transmission for pivoting said second component relative to said first component between a plurality of different positions, said transmission including means for releasably holding said second component in a selected position.

2. The hinge joint of claim 1, wherein said bearing surrounds a portion of said second component, said internal surface being provided in said first component.

3. The hinge joint of claim 1, wherein said sections are mirror images of each other with reference with a plane including said axis.

4. The hinge joint of claim 1, wherein said biasing means comprises a spring having an arcuate median portion extending circumferentially of said pintle and two end portions extending substantially axially of said pintle and each engaging one of said sections.

5. The hinge joint of claim 1, wherein said biasing means comprises a torsion spring.

6. The hinge joint of claim 1, wherein said bearing surrounds a substantially centrally located portion of said second component and said portion of said second component includes a sleeve which surrounds said pintle with clearance, said bearing surrounding said sleeve and being surrounded by said member.

7. The hinge joint of claim 4, wherein said second component further comprises a substantially plate shaped portion and said sleeve is non-rotatably anchored in said plate shaped portion.

8. The hinge joint of claim 1, wherein said second component has a chamber for said biasing means.

9. The hinge joint of claim 8, wherein said bearing surrounds a portion of said second component and said portion of said second component includes a sleeve bounding a portion of said chamber.

10. The hinge joint of claim 9, wherein said chamber is an annular chamber which surrounds said sleeve.

11. The hinge joint of claim 1, further comprising means for reducing friction between said internal surface of said one of said first and second components and said sections.

12. The hinge joint of claim 11, wherein said sections have external surfaces adjacent said internal surface and said friction reducing means is provided on at least one of said surfaces.

13. The hinge joint of claim 12, wherein said friction reducing means comprises a lubricant.

14. The hinge joint of claim 1, wherein said internal surface is provided in said first component and further comprising a substantially annular centering element surrounded by said internal surface and adjacent said sections as seen in the axial direction of said pintle.

15. The hinge joint of claim 14, wherein said element has an external surface adjacent said internal surface of said one of said first and second components and at least one of said external and internal surface is provided with friction reducing means.

16. The hinge joint of claim 15, wherein said friction reducing means comprises recesses in one of said surfaces to thus reduce the overall area of contact between said surfaces.

17. The hinge joint of claim 15, wherein said friction reducing means includes facets forming part of one of said surfaces to thus reduce the overall area of contact between said surfaces.

18. The hinge joint of claim 15, wherein said friction reducing means comprises a lubricant.

19. The hinge joint of claim 16, wherein said lubricant is a lacquer.

* * * * *